(12) United States Patent
Rabaioli et al.

(10) Patent No.: US 11,078,367 B2
(45) Date of Patent: Aug. 3, 2021

(54) HYDROPHOBIC SURFACE MODIFIED ALUMINAS AND METHOD FOR MAKING THEREOF

(71) Applicant: Sasol (USA) Corporation, Houston, TX (US)

(72) Inventors: Maria Roberta Rabaioli, Westlake, LA (US); Anthony Mai, Westlake, LA (US); Ryan Loscutova, Houston, TX (US)

(73) Assignee: Sasol (USA) Corporation, Houston, TX (US)

(*) Notice: Subject to any disclaimer, the term of this patent is extended or adjusted under 35 U.S.C. 154(b) by 98 days.

(21) Appl. No.: 16/608,483

(22) PCT Filed: Jun. 12, 2018

(86) PCT No.: PCT/US2018/037007
§ 371 (c)(1),
(2) Date: Oct. 25, 2019

(87) PCT Pub. No.: WO2018/231761
PCT Pub. Date: Dec. 20, 2018

(65) Prior Publication Data
US 2020/0056049 A1    Feb. 20, 2020

Related U.S. Application Data

(60) Provisional application No. 62/520,163, filed on Jun. 15, 2017.

(51) Int. Cl.
*C01F 7/02*    (2006.01)
*C09C 1/40*    (2006.01)
*C01F 7/30*    (2006.01)

(52) U.S. Cl.
CPC ............... *C09C 1/407* (2013.01); *C01F 7/30* (2013.01); *C01P 2002/60* (2013.01);
(Continued)

(58) Field of Classification Search
CPC ...... C01F 7/02; C01F 7/30; C01F 7/44; C01P 2004/54; C01P 2006/12; C01P 2006/14
See application file for complete search history.

(56) References Cited

U.S. PATENT DOCUMENTS

2007/0098990 A1    5/2007  Cook et al.
2009/0232727 A1*   9/2009  Sato ................. C01F 7/448
                                              423/626
(Continued)

FOREIGN PATENT DOCUMENTS

WO    2015/110913    7/2015
WO    2017/075333    5/2017

*Primary Examiner* — Hoa (Holly) Le
(74) *Attorney, Agent, or Firm* — Bushman Werner, P.C.

(57) ABSTRACT

A method of producing a hydrophobic porous alumina by: i) providing a slurry comprising an alumina compound, the slurry having a pH equal to or greater than 7; ii) adding an organic composition comprising carboxylic acids with alkyl hydrocarbon chains having a carbon length less than 14 to the slurry to form an acidic modified slurry; the acidic modified slurry having a pH of between 3 and less than 7; iii) hydrothermally aging the acidic modified slurry to form a hydrothermally aged slurry; and iv) drying the hydrothermally aged slurry.

10 Claims, 8 Drawing Sheets

(52) U.S. Cl.
CPC ...... *C01P 2002/82* (2013.01); *C01P 2004/03* (2013.01); *C01P 2004/54* (2013.01); *C01P 2006/12* (2013.01); *C01P 2006/14* (2013.01); *C01P 2006/80* (2013.01)

(56) References Cited

U.S. PATENT DOCUMENTS

| | | | |
|---|---|---|---|
| 2012/0114883 A1 | 5/2012 | Kapur et al. | |
| 2012/0289653 A1* | 11/2012 | Oda | C01F 7/02 524/786 |
| 2018/0291209 A1* | 10/2018 | Rabaioli | C01F 7/021 |

* cited by examiner

Silica glass    Polystyrene    PMMA

Silica glass

Polystyrene

Sulfonic polystyrene

PMMA

Nylon 12

Polystirene at x10,000    Polystyrene at x35,000

HYDROPHOBIC SURFACE MODIFIED ALUMINAS AND METHOD FOR MAKING THEREOF

CROSS-REFERENCE TO RELATED APPLICATION

This application claims priority to U.S. Application 62/520,163, filed Jun. 15, 2017, the disclosure of which is incorporated herein by reference for all purposes.

THE INVENTION relates to a novel method for producing a new hydrophobic porous alumina, to a new hydrophobic porous alumina, and to a composition comprising a new hydrophobic porous alumina and a substrate.

BACKGROUND

Aluminas and silicas when treated form the basis of hydrophobic surface modified metal oxides. These hydrophobic surface modified metal oxides include spacers or antiblocking agents which improve the performance of substrates including polymers, toners, coating systems, surface additives, and other high value-added products for applications that require a high degree of dispersibility. In these applications, the ability of the hydrophobic surface modified metal oxides to be deagglomerated down to submicron size, as well as their ability to adhere to specific substrate surfaces is necessary to achieve and enhance the properties of high value-added products, an example being toner products.

Factors which affect the properties of the hydrophobic surface modified metal oxides include the type of base metal oxide selected, particle morphology of the surface additive, surface area of the particles of the surface additive, and surface chemistry of the particles of the surface additive.

The choice of the base metal oxide is important when determining what properties the hydrophobic surface modified metal oxides require. For example a person skilled in the art of the invention knows that not all chemical treatments can be applied equally to all metal oxides, for instance, not all treatments used for silica particles can be applied to alumina.

The main problem when dealing with hydrophobic surface modified metal oxides is the agglomeration of fine or nano metal oxide particles which form due to interaction forces. Submicron particles can be highly agglomerated and these agglomerations in turn reduce the exposed surface area of the particles forming part of the agglomeration. Such agglomerations therefore reduce the advantages that the hydrophobic surface modified metal oxides offer to the products into which they are incorporated.

The synthesis of these hydrophobic surface modified metal oxides is critical for the successful creation of desired characteristics of subsequent products into which they are incorporated. Another problem with these hydrophobic surface modified metal oxides is their relatively low stability and in order to improve this stability and prevent the degradation of the hydrophobic surface modified metal oxides, specialized treatment under low temperature and vacuum are used during their synthesis.

Customers are demanding greater surface additive performance and higher quality products. In order to address these demands, post-processing methods to improve hydrophobic surface modified metal oxides based on mixing/wetting, and ball milling have been studied and improved. These post processing methods are known in the art. Even though these methods are used to improve hydrophobic surface modified metal oxides, the hydrophobic surface modified metal oxides produced using these processes can include particles in a form that makes them incompatible with preferred polymers or solvents for example. Furthermore, nanoparticles are difficult to re-process because of their chemical structure, high surface area and low intra particle porosity.

Thus, there is a need for an alternative hydrophobic surface modified metal oxide and method that can provide the desired properties including improved hydrophobicity and dispersibility, with reduced additive impaction.

INVENTION

According to a first aspect of the invention there is provided a method of producing a hydrophobic porous alumina comprising the following steps:
 i) providing a slurry comprising an alumina compound, the slurry having a pH equal to or greater than 7;
 ii) adding an organic composition comprising carboxylic acids with alkyl hydrocarbon chains having a carbon length less than 14 to the slurry to form an acidic modified slurry; the acidic modified slurry having a pH of between 3 and less than 7;
 iii) hydrothermally aging the acidic modified slurry to form a hydrothermally aged slurry; and
 iv) drying the hydrothermally aged slurry.

The alumina compound includes an aluminum oxide hydroxide (AlOOH), a boehmite or a pseudoboehmite (namely α-alumina monohydrate, identifiable by X-ray diffraction as described in the A.S.T.M. (American Society for Testing and Materials). Preferably the alumina compound includes a boehmite or a pseudoboehmite, and most preferably a boehmite. The alumina compound may be derived from water hydrolysis of an aluminum alkoxide, or from other alumina sources such as a sodium aluminate source, an alum source, or numerous other variations.

More particularly, the alumina compound suitable for the method of the present invention may be obtained from hydrolysis of aluminum alkoxide.

The alumina compound is made up of crystallite sizes on the (020) axis in the range of 1 to 60 nm, preferably 2 to 50 nm, and most preferably 3 to 40 nm.

The aluminum compound has an aspect ratio of 1 to 5; preferably the alumina compound has an aspect ratio of 1 to 3.

The alumina compound is made up of different shaped crystals including hexahedral, tablet-like, block-like, plate-like structures, or combinations thereof. It preferably has a plate-like or block-like structure or combinations thereof. Most preferably, the alumina compound has a block-like structure i.e. an aspect ratio of 1.

The slurry is preferably an aqueous slurry. A fluid, for example water, can be added to maintain a fluid slurry before or after the addition of the organic composition. In a more preferred embodiment of the invention the aqueous slurry comprising the alumina compound is an intermediate stream of the Ziegler industrial production of AlOOH from the hydrolysis of aluminum alkoxide. In such a case the aqueous slurry preferably has a pH of greater than 7.0 to 10.0, preferably a pH of 8.0 to 10.0.

The organic composition comprises a carboxylic acid functional group with alkyl hydrocarbon chains binding to a surface of the alumina compound.

The organic composition comprises a matrix of short chain fatty acids, short chain hydroxy fatty acids, interlinked chains of the above and esters. The organic composition has a carboxylic acid functional group with alkyl hydrocarbon chains having a specific length that bind to a surface of the alumina compound.

The organic composition comprises carboxylic acids with an alkyl hydrocarbon chain having a carbon length equal to or less than 14, preferably a carbon length less than 12, more preferably a carbon length less than 10, more preferably 9, and even more preferably a carbon length of 8 or less than 8.

The organic composition may have a carboxylic acid functional group comprising hydroxyl and/or amino groups with alkyl hydrocarbon chains having carbon lengths less than 14, preferably less than 12, more preferably less than 10, even more preferably less than 9, and then more preferably a carbon length of 8 or less than 8.

Once the organic composition is added to the slurry, an acidic modified slurry is formed. The acidic modified slurry has a pH of between 3 and less than 7, preferably a pH of between 3.5 and 5.5.

The organic composition content relative to the content of alumina compound in the acid modified slurry is between 0.5 and 10% wt, preferably 0.5 and 5% wt. This is less than the stoichiometric value of the organic composition.

The acidic modified slurry is then hydrothermally aged under moderate conditions.

The hydrothermal aging treatment is performed at a temperature between 90° C. to 200° C., more preferably 100 to 180° C., even more preferably 100 to 140° C. and most preferably 100 to 120° C. The heat can be supplied through an external source, e.g. electrical or via circulating oil in external jacket, or through direct injection of high pressurized steam.

The resultant hydrothermally aged slurry is maintained at the temperature of the hydrothermal aging for a period of time that depends mainly on the temperature and agitation. Generally speaking, the duration of such aging can be between 1 hour and 6 hours, preferably 1 to 5 hours and most preferably 2 hours. During the hydrothermal aging concomitant growth of the alumina crystal particles occurs to provide for specialized morphologies.

As the carboxylic acid in the organic composition is introduced a reaction occurs at a surface of the alumina compound with the OH surface groups of the alumina compound for example the boehmite.

These OH groups of the alumina compound react with the OH group bonded to the carbonyl group of the carboxylic acid to form a stable layer on the alumina surface as the molecules are strongly bonded to the surface of the alumina. This is advantageous because due to the hydrophobic coverage with such bonds any free water is easily desorbed rather than reacting back with the alumina surface OH, and this also improves the strength of the bonds.

If the surface area available on the alumina surface for adsorption is known, the number of surface OH groups per unit mass of the crystallites can be determined using the formula (Nanotechnology Technical Basis and applications, Stefan Sepeur, 2008, page 100):

$$Sc\ (m^2/g)/\text{space requirement of one OH group }(m^2)$$

where
Sc=Average Surface area of crystallites (average crystallite surface based on crystallite shape which can be determined experimentally by measuring the BET surface area), and the space OH requirement is assumed to be about 18 Å$^2$ (=18·10$^{-20}$ m$^2$).

If one divides the calculated result by the Avogrado's number, Nav=6.022·10$^{23}$, one can calculate the stoichiometric amount value of the organic composition in mol/g at 1:1 reaction of OH group: organic composition modification.

Using the above one can compare with the actual coverage of the surface of the alumina by the organic composition if one divides the value received for the organic composition on the surface of the alumina compound after treatment. This is advantageous as the desired properties can be obtained with the addition of a weighted amount of organic composition that can be lower than a stoichiometric amount based on the OH groups i.e. 0.42 mmol/g of the organic composition on a surface of the alumina.

The hydrophobic porous alumina of the invention has a residual amount of organic composition measured through catalytic combustion analysis (equipment used—Laboratory Equipment Corporation, hereinafter "LECO") of between 0.5 and 10 parts in 100 parts of alumina compound. This is lower than the estimated stoichiometric amount.

This allows one to perfect different properties of the alumina compound, for example shape, porosity and hydrophobicity of the alumina compound by changing the surface coverage of the organic composition, the type of organic composition used and drying conditions.

The alumina compound crystallites (for example boehmite crystallites) grow due to an Ostwald ripening mechanism. The major face of an alumina crystallite is the (020) face on which the OH groups are exposed. The other two faces, (200) and (002), have no OH groups exposed; thus the organic composition is strongly bonded on specific surfaces of the crystallites i.e. crystal growth along the shorter axis is suppressed through specific surface-capping on the (020) planes.

This has been found to enhance dissolution and crystal growth along the other faces. Specifically it has been found that crystals tend to grow preferentially along the (200) direction, resulting in a platy-oblong shape along the (200) face.

It has also been found that the thickness of the crystallites decreases (increasing the value of 200/020 aspect ratio) with decreasing length of the alkyl carbon chain of the organic composition added to the alumina slurry.

Furthermore, it has been found that using a carboxylic acid with a carbon length chain of less than 10, for example, allows one to work with an acidic modified slurry in step ii) of the process at an acidic pH of pH 4.0 or 5.0 for example.

According to the method of the present invention, the loose agglomerates can be obtained through the use of a small amount of organic composition on the surface of the alumina, between 2 and 4% of the organic compound on the surface of the alumina (about 40% of the estimated stoichiometric amount).

Due to the very effective hydrophobic coverage, any free water is easily desorbed rather than reacted back onto the alumina OH surface, which thus improves the strength of the bonds.

The effectiveness of the process of the present invention is that one is able to obtain a variety of product characteristics for a wide range of conditions.

At the end of the hydrothermal aging treatment, the resulting system enters a drying chamber where the hydrothermally aged slurry is dried and a powder is obtained. The drying temperature can range in gas temperature of from 95° C. to 280° C., preferably 120 to 260·c, most preferably 230 to 260·c. Any free water is removed by drying; and the only reactive surface is the alumina modified by the organic composition.

The hydrothermally aged slurry may be dried in a spray dryer or a contact dryer, but other dryers that can operate under appropriate temperature conditions can be used. A drying gas can be passed co-current, or counter-current, where hot air flows against the flow of the atomizer. With co-current flow, particles spend less time in the system and in the particle separator (typically a cyclone device).

The advantage of the method of the present invention is that the particles of the hydrophobic porous alumina can be deagglomerated to a size of primary nanocrystallites by blending, for example, a dry mixing with soft mechanical action of the powder with a solid substrate. The process of the present invention may further include the step of dry mixing hydrophobic porous alumina having different properties for example hydrophobic alumina having different crystal sizes.

The crystallites particles grow with a unique morphology characterized by a macro-reticular porous network, yielding to a softer agglomeration in a powder material. It was surprisingly found that such modified aluminas can be deagglomerated to submicron size with substrates including polymer particles, polymeric resins comprising nylon, polystyrene, acrylic and other, or metal oxides such as silica glass, zinc oxide, iron oxide etc. and adhere to these substrates. This makes the hydrophobic porous alumina a candidate for use in toner applications for example as the nano-crystal particles disperse onto the surface, regardless of the chemical affinity between the surface and the dispersed nano particles. The particles can be dispersed through dry mixing without additional wetting chemicals or compatibilizers.

Another advantage is that the hydrophobic porous alumina produced by the method of the present invention can be uniformly dispersed into a substrate, for example a polymer, as single nano crystal particles by direct melt compounding with a high level of deagglomeration.

Further the nano structured hydrophobic porous alumina product does not require the intense mixing of the known prior art methods.

According to a second aspect of the invention there is provided a porous hydrophobic alumina prepared according to the method of the invention.

The porous hydrophobic alumina comprises an alumina compound and an organic composition, the organic composition comprising carboxylic acids with alkyl hydrocarbon chains having a carbon length of less than 14, preferably less than 12 and more preferably less than 10 and even more preferably 8 or less than 8, the organic composition being strongly bonded to a surface of the alumina compound to form a layer on the alumina surface, the hydrophobic porous alumina having a residual amount of organic composition measured through catalytic combustion analysis (LECO) of between 2 and 100 parts of the alumina compound.

After drying, the final product is a porous hydrophobic alumina. The particles of this alumina are characterized by a unique macro-reticular morphology of platy-oblong nanocrystallites distributed in a porous network, as showed by Scanning Electron Microscopy (SEM). The porous structure is generated through the crystallites morphology. Due to the morphology, the tendency of the powder to be deagglomerated by simple methods is greatly enhanced; thus the powder can be dispersed below 100 nm by blending, and forms a stable coating layer on the surface of substrates, for example polymers.

The porous hydrophobic alumina product has a residual moisture value below 5000 ppm.

The aspect ratio of the porous hydrophobic alumina product is between 1.80 to 5.0, preferably, 1.80, and 3.5, most preferably between 2 and 3.5. The aspect ratio can be calculated by the size of crystals that are derived in directions along lines perpendicular to the planes of the X-ray diffraction patterns by using the Scherrer formula. The aspect ratio is calculated by the ratio between the (200) plane and the (020) plane. This is illustrated in FIG. 1.

The crystallite size of the porous hydrophobic alumina product is between 1 and 60 nm along the (020) plane.

The average pore volume is between 0.55 cc/g to 2.0 cc/g, more preferably between 0.55 cc/g and 1.1 cc/g. The pore structure of the porous hydrophobic alumina is formed through an open packing arrangement of crystallites forming a macroporous network.

The specific surface area (BET method $N_2$ adsorption) of the porous hydrophobic alumina product is between 30 $m^2/g$ and 300 $m^2/g$, preferably between 30 $m^2/g$ and 150 $m^2/g$ and most preferably between 30 $m^2/g$ and 100 $m^2/g$.

Due to the porous network morphology, materials can be dispersed through the breakdown of the soft agglomerates to colloidal sizes without intense mixing in organic systems. Thus the inherent properties of the porous hydrophobic alumina product make it advantageous in polymer resins and in processes for fabricating nanocomposites by direct mixing over other developed methods already known to those skilled in the art.

According to a third aspect of the invention there is provided a composition including a porous hydrophobic alumina prepared according to the method of the invention and a substrate.

The substrate may include polymers, crosslinked polymers, nylon resins, and acrylic resins e.g. polymethylmethlacrylate (PMMA), polystyrenes, styrene acrylate resins, polyester resins, waxes, polyolefins e.g. polyethylene, polypropylene, polycarbonate, polyurethane, polyethylene terephthalate, rubber, epoxy resins, silicone, cellulose, fabric, polytetrafluoroethylene, silica glass particles, metal oxides, ceramics and carbon substrates. The substrate preferably includes polystyrene, acrylic, polyesters resins, polyolefins, polycarbonate, and crosslinked polymers.

Representative but non-limiting applications for the compositions obtained by this process include coatings; spacer or anti-blocking agents; plastics and elastomers; scratch resistant coatings; polishes, thickening agents and rheology modifiers; additives for improving flow behaviour of powders; additives for enhancing the heat transfer behaviour of fluids and solids; fabric treatment; paper treatment; soil resistant coatings; flame retardants; inkjet recording media (toners) and barrier coatings.

EXPERIMENTAL

The invention will now be described with reference to the following Figures and non-limiting example where:

The following terms are used in the experimental section:

FTIR means Fourier Transform Infrared.

DRIFT means Diffuse Reflectance Infrared Fourier Transform.

LECO is the apparatus/method used to measure the amount of carbon of the powder.

BET Equation is Brunauer-Emmett-Teller method to determine the Specific Surface area by $N_2$ gas adsorption at temperature of 77 K.

$N_2$ adsorption method is the method used for the Pore analysis (Average Pore Diameter)

SEM means Scanning Electron Microscopy.

The inherent properties of the products are measured by the following methods:

DRIFT spectra were registered on self-supporting powders with an FTIR Variant apparatus, 32 spectral acquisitions per sample. Information about the functional group of the organic compound is easily obtained by the presence of the band in the range of 1700-1800 cm-$^1$. Differences became evident after reaction by the spectral behaviour in the range 1580-1590 cm-$^1$ assigned to the organic linked to the alumina surface.

Figure 1:
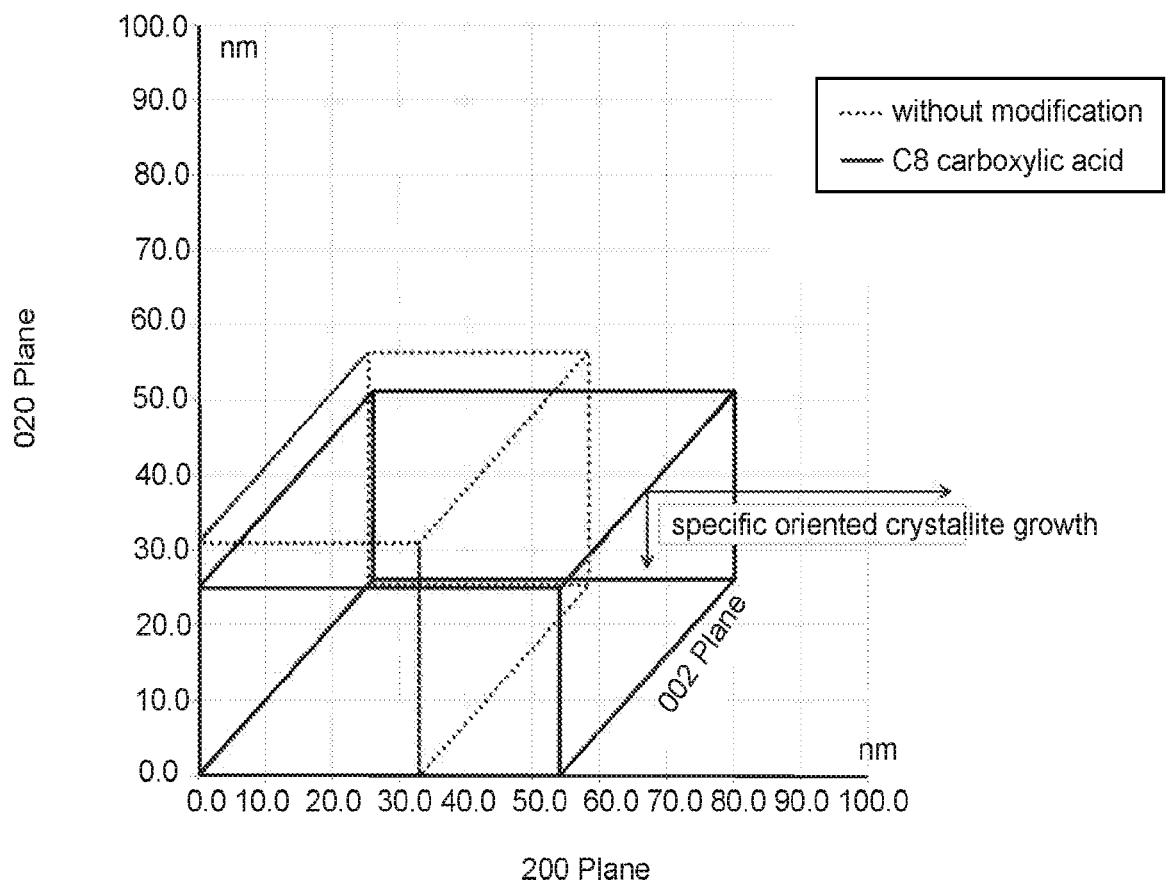
FIG. 1 is the simplified tri-dimensional graphical representation of a primary crystallite shape that can be obtained with the method of the present invention.

Crystal size information is obtained from three diffraction peaks, the (020), the (200), the (002) peaks. These three peaks (crystal planes) are the most accessible in alumina's x-ray diffraction pattern. The ratio of the 200/020 crystal size is the aspect ratio. This ratio can only approach unity if the (200) crystal size is short relative to the (020) size. A representation of the (020), the (200) and the (002) is showed in FIG. 1. The procedure consists of: data collection, calculation of the scattering factor; and finally the x-ray diffraction profile. The data treatment and curve fitting is carried out with high accuracy and requires several hours as long collection times are required to improve the signal to noise ratio with several scans per step. This is known to a person skilled in the art. The theoretical concepts behind the calculation of the crystal sizes is known. The determination is made by measuring diffraction peak widths. The size is calculated by the Scherrer equation.

$$Csize = (0.94)\lambda(57.3)/(B\cos(\theta))$$

0.94 is a shape factor, $\lambda$ is the x-ray wavelength used (1.5418 A). 57.3 is a radian/degree conversion factor. B is the full width at half maximum of the peak minus the instrumental broadening. $\theta$ is one half the diffraction angle ($2\theta$) for the peak. The x-ray wavelength used is the weighted average of the copper $K\alpha 1$ and $K\alpha 2$ components.

The BET surface area and pore volume data were determined by $N_2$ adsorption according to the ASTM method. Data was collected after a heat treatment at 110° C. for 2 hours with vacuum at 1 Torr. The surface area (m$^2$/g) was evaluated using the BET equation. The total pore volume was determined from the volume of nitrogen adsorbed at relative pressure $p/p_0$ equal to 0.992.

The samples for SEM were prepared on an SEM stub, spin coated with gold and therefore evaluated on a JEOL SEM microscope.

The amount of organic composition utilized is determined by means of a carbon analyzer by using a LECO Apparatus. A sample of the powder that contains the organic composition is weighted in a crucible and combusted inside a furnace system that operates with pure oxygen to ensure the complete combustion of all organic composition in the sample, the carbon content of the sample by % weight is determined. Afterwards, the amount of organic composition on the powder (% wt) is calculated from the carbon amount by using the molecular formula.

Deagglomeration tests were carried by weighting 0.5 parts of powder per 100 part of substrate in a closed container and shaken with a vortex for 5 minutes.

Dispersibility tests were carried out by weighting 3 parts of powder per 100 part of liquid solvent and hand shaking for 10 minutes. For the dispersion in TEG and PEG due to the high viscosity of the liquid, 30 sec of sonication treatment in a water batch was subsequently applied in order to homogenize the dispersion. The dispersion quality was judged by observation of sedimentation behavior after 30 minutes. The % wt. of particles dispersed was also evaluated after centrifugation from the solid residue after drying at 120° C. and determined taking into account the total amount of powder initially added.

Example 1

A boehmite (AlOOH) slurry from the Ziegler alcohol process having a pH of about 9.0 was prepared. The starting boehmite alumina crystallite had a blocky-like shape with size from the X-ray (020) reflex of 31 nm, 33 nm (200) and 36 nm (002), with aspect ratio 200/020 equal to 1.06.

An amount of organic composition, in this case, octanoic acid (carboxylic acid having a carbon chain length of 8) equal to 7.8 parts in 100 parts of powder (0.54 mmol/g of powder) was reacted in a stirred vessel with the boehmite slurry at 105° C. for 2 hours to form an acidic modified slurry. The acid underwent fast homogenization with the alumina slurry to obtain a milky acidic modified slurry having a pH of 4.0.

The milky acidic modified slurry was dried under nitrogen flow with a nozzle spray atomizer at temperature of the in-gas of 230° C. and out-gas temperature of 90+/−5° C. by adjusting the acidic modified slurry flow rate.

The resulting crystallites were thinner along the (020) axis and wider along the (200) axis, have an aspect ratio of 2.16 that shows it is platy-oblong.

The BET surface area available for adsorption was 46 m$^2$/g. The estimated number of OH groups was about $2.5 10^{20}$/g, which accounts for about 0.42 mmol/g of organic modification to be added.

The hydrophobic porous alumina had a residual amount of organic composition measured through catalytic combustion analysis of 4.2 parts in 100 parts of powder (0.29 mmol/g powder) that is less than the estimated stoichiometric amount of 0.42 mmol/g.

Figure 2:
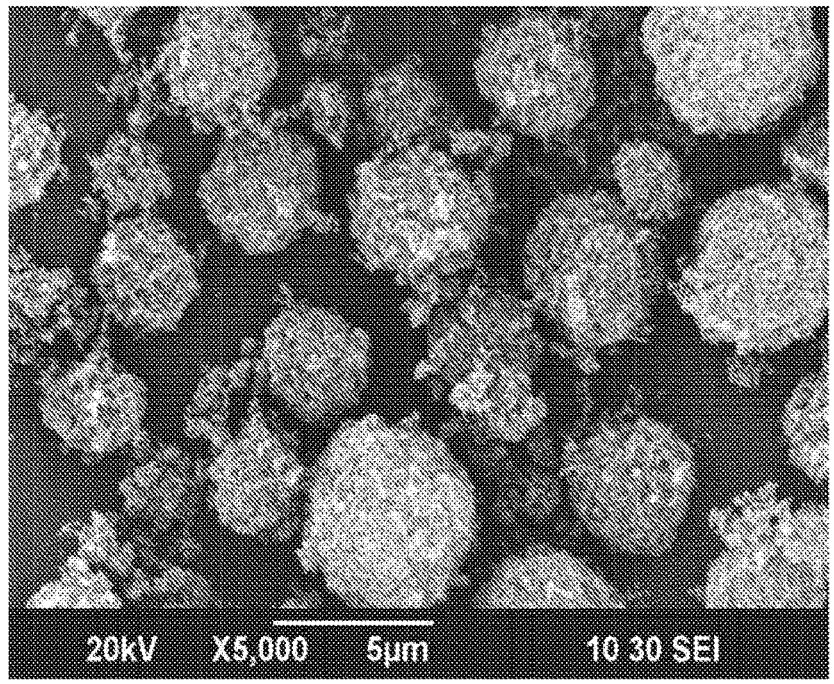
FIG. 2 is an SEM photo that shows the particle morphology of the product of Example 1.
Figure 6:
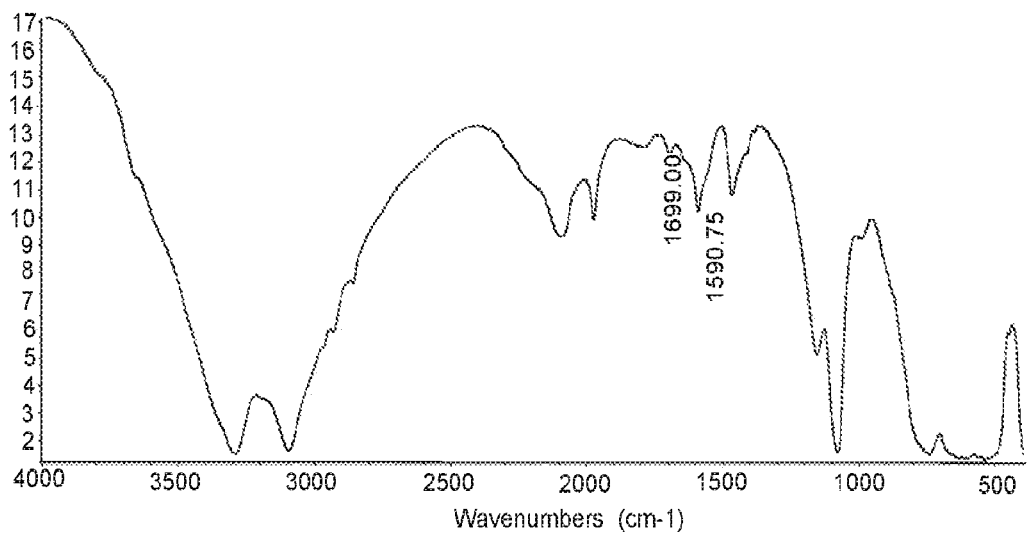
FIG. 6 is an FTIR spectra of the Alumina formed as per Example 1.
Figure 8:
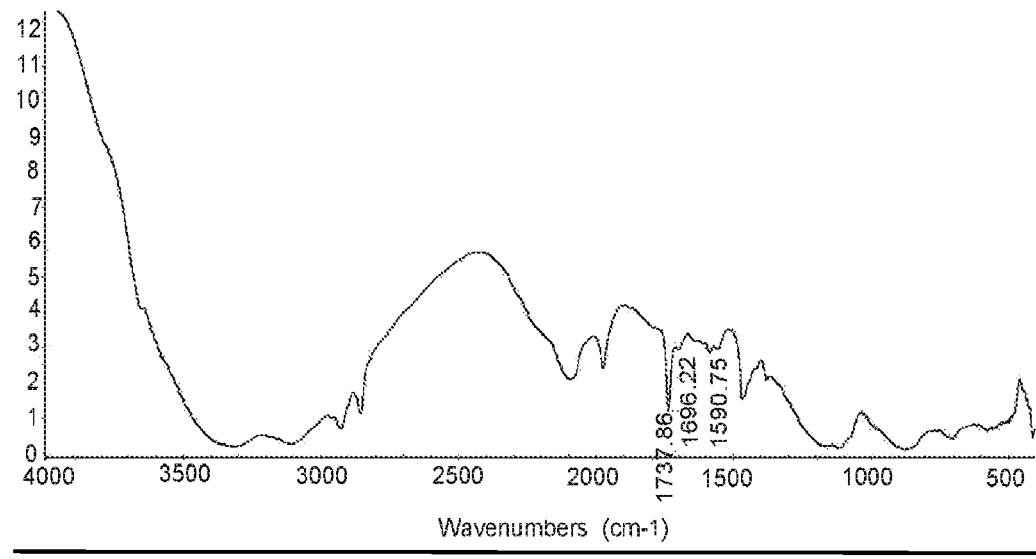
FIG. 8 is an FTIR spectra of the Alumina formed as per Comparative Example 1.
Figure 9:
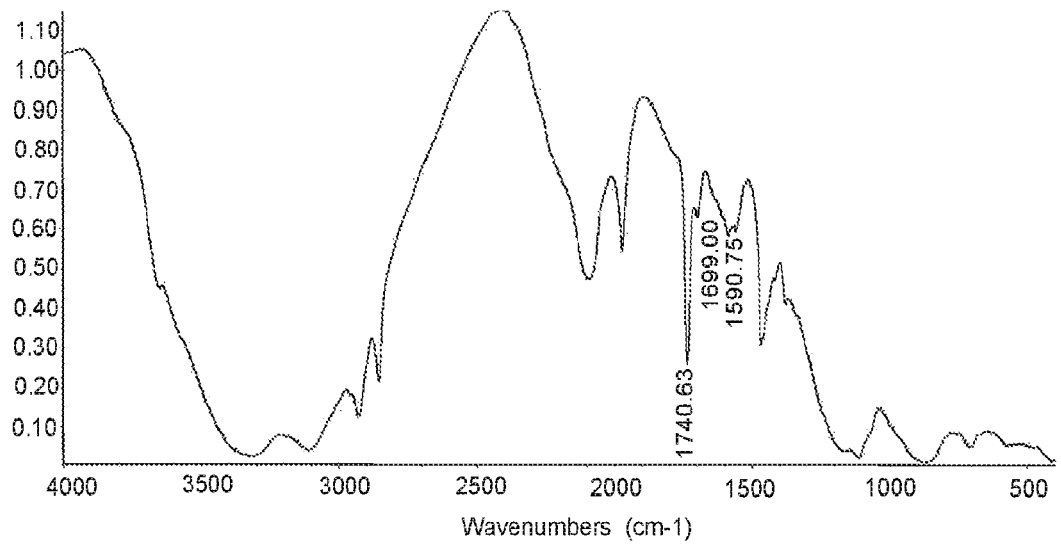
FIG. 9 is an FTIR spectra of the Alumina formed as per Comparative Example 2.

The organic composition was strongly bonded to the alumina compound as confirmed by the FTIR spectra FIG. 6 by the appearance of the band at 1590 cm-$^1$, and the complete disappearance of the organic functional group band at 1700 cm-$^1$. This was not shown in Comparative Examples 1 and 2 (FIGS. 8 and 9). The particles morphology is shown in FIG. 2.

In order to measure the pore structure of the hydrophobic porous alumina, $N_2$ adsorption method was applied on the hydrophobic porous alumina. Data was collected on heat treated samples at 110° C. for 2 hours with vacuum at 1 Torr. The specific surface area of the hydrophobic porous alumina ($m^2/g$) was evaluated using the B.E.T. equation. The pore volume was determined from the volume of nitrogen adsorbed at saturation (evaluated at relative pressure $p/p_o$ equal to 0.992). The pore volume determined with this method was contained in pores filled up to about 269 nm.

Figure 3:
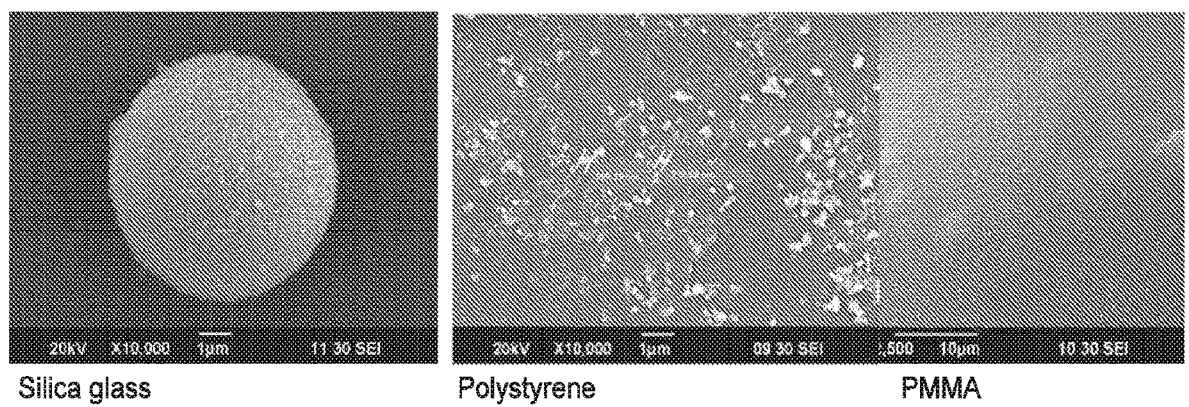
FIG. 3 shows the product of Example 1 coated onto different substrates (silica glass particles (glass bead), nylon resin (nylon 12) and PMMA.

The hydrophobic porous alumina powders were deagglomerated to nanosize with single nano crystals by light blending and incorporated with different substrates including polymeric and non polymeric substrates. As can be seen from FIG. 3 the powders coat the different substrates.

The particles were not wetted by water but could be wetted by hexane for example and have dispersed giving opalescent systems without sedimentation.

Example 2

This example shows that it is possible to fine tune the properties of the porous hydrophobic alumina with a minor organic composition modification without changing the ability of the nanocrystallites to be deagglomerated. The porous hydrophobic alumina was prepared according to Example 1, but the amount of organic composition i.e. C8 carbon chain was decreased. The final powder had a residual amount of organic composition measured through catalytic combustion analysis of 2.6 parts in 100 parts of powder, that counts for only 0.18 mmol/g of the organic composition on surface.

Figure 7:
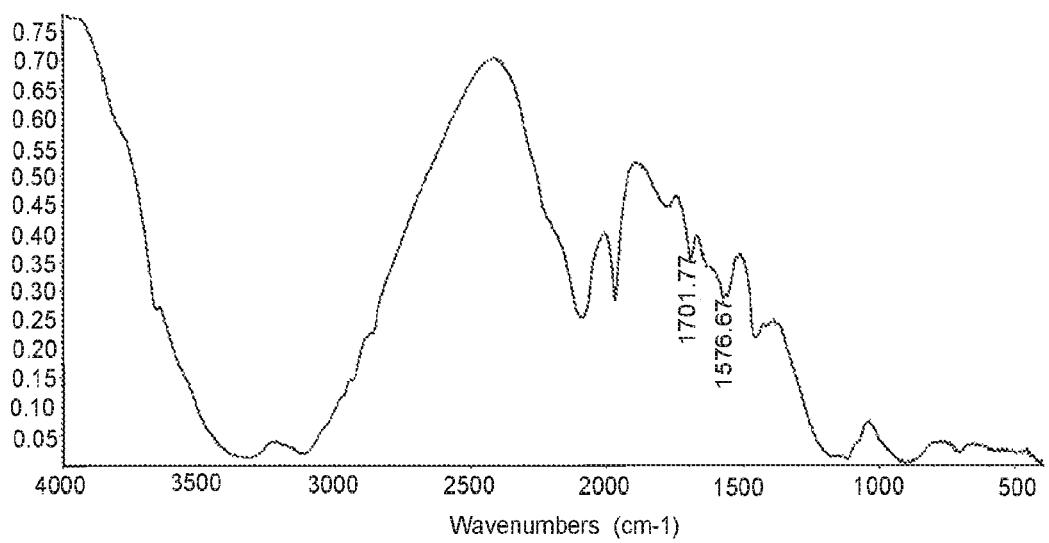
FIG. 7 is an FTIR spectra of the Alumina formed as per Example 2.

The organic composition was strongly bonded to the alumina compound as confirmed by the FTIR spectra, FIG. 7. The spectra is similar to the Example 1 leading to the same conclusions, and it is different from Comparative Examples 1 and 2, FIGS. 8 and 9.

Figure 4:
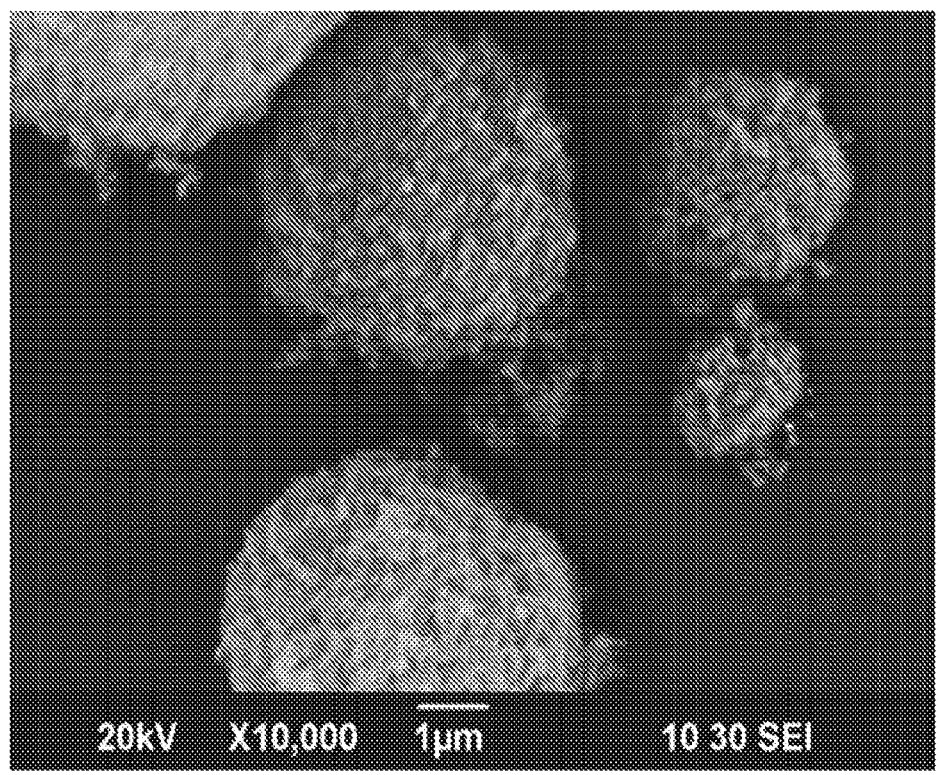
FIG. 4 shows the morphology of particles from Example 2 from SEM.
Figure 5:
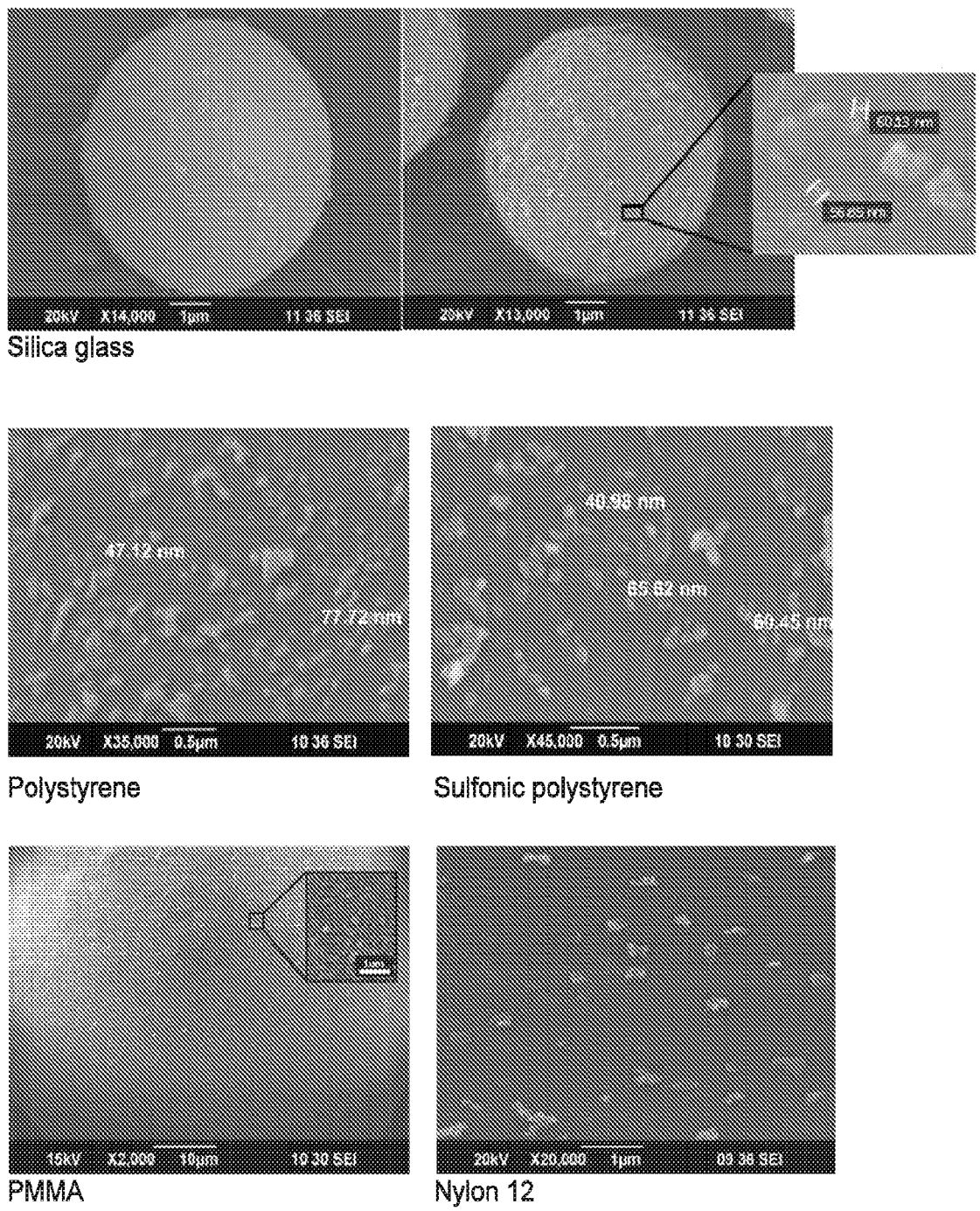
FIG. 5 shows the product of Example 2 coated onto different substrates (silica glass particles (glass bead), polystyrene, sulfonic polystyrene resin, PMMA and nylon (nylon 12))

FIG. 4 shows the morphology of the particles. FIG. 5 shows the deagglomerated hydrophobic porous alumina on several substrates including silica glass, polystryrene, sulfonic polystyrene resin, PMMA and nylon (nylon 12).

The particles were dispersed giving opalescent systems without sedimentation.

Comparative Example 1

This example exemplifies the use of an organic composition including an alkyl hydrocarbon chain length of 18. An amount of an organic modifier composition which is a polymerized chain fatty acid having a carbon chain of greater than 16 was reacted in a stirred vessel with the boehmite slurry of Example 1 at 105° C. for 2 hours. The resulting mixture had a pH of 7.0.

The milky mixture was dried under nitrogen flow with a nozzle spray atomizer at temperature of the inlet air of 260° C. The resulting crystallites were thinner than the starting alumina compound, the aspect ratio was 1.75. As per FIG. 8, this comparative composition had a different spectra than that of Example 1 and Example 2.

The final powder had an amount of organic composition of 14 parts in 100 parts of powder (0.49 mmol/g powder) that is higher than in the Example 1 and is comparable to the stoichiometric estimated value.

Comparative Example 2

This example exemplifies a modified drying operation for producing modified boehmite with an organic composition having a C18 chain by using a screen to deagglomerate particles before drying. An amount of the organic modifier composition which has been used in the Comparative Example 1 was reacted in a stirred vessel with the boehmite slurry of Comparative Example 1 at 105° C. for 2 hours. The resulting milky mixture had a pH of 7.0.

A screen pack was installed on the line to the nozzle dryer to remove clots or agglomerates. The milky mixture was dried under air flow with a nozzle spray atomizer at temperature of the inlet air of 260° C. The resulting crystallites were thinner than the starting alumina compound, the aspect ratio was 1.69.

The final powder had an amount of organic composition of 14 parts in 100 parts of powder (0.49 mmol/g powder). The FTIR spectra, FIG. 9, has similar features to Comparative Example 1.

The properties of the modified aluminas (AlOOH-M) of Examples 1 and 2 and Comparative Examples 1 and 2 are summarized in Table 1.

TABLE 1

Properties of the Aluminas of the Examples and Comparative Examples

| | Unit | AlOOH—M boehmite modified Example 1 | AlOOH—M boehmite modified Example 2 | AlOOH—M boehmite modified Comparative Example 1 | AlOOH—M boehmite modified Comparative Example 2 |
|---|---|---|---|---|---|
| Carbon chain | | C8 | C8 | C18 | C18 |
| Csize 020 | Nm | 25 | 27 | 32 | 32 |
| Csize 200 | Nm | 54 | 56 | 56 | 54 |
| Csize 002 | Nm | 27 | 32 | 35 | 33 |
| Aspect Ratio 200/020 | | 2.16 | 2.07 | 1.75 | 1.68 |
| Organic composition content | % wt | 4.2 | 2.6 | 14 | 14 |
| Specific Surface Area BET | m2/g | 51 | 52 | 28 | 27 |
| Pore Volume | Cc/g | 0.94 | 0.85 | 0.51 | 0.51 |
| Dispersibility | | Hexane | Propylene carbonate Propanediol PEG TEG | Hexane | Hexane |

From Table 1 it is clear that the process of the present invention produces modified alumina where the morphology of the crystals has an oblong shape. This is clear as the aspect ratio of the modified alumina is greater than 1.80. The crystals become more oblong with the use of a carboxylic acid having a carbon chain of 8 (Example 1 and Example 2 versus Comparative Examples 1 and 2) and require less than the stoichiometric value of the organic composition. The products of Examples 1 and 2 have a higher surface area and pore volume when compared with the Comparative Examples 1 and 2.

Example 3

The following example describes the use of an organic composition having an amino group and an alkyl carbon chain of 6. A weighted amount of Leucine (amino acid with alkyl chain of 6) was added to water and stirred at room temperature until a not-completely clear solution was obtained. The not-completely clear solution was mixed with a boehmite (AlOOH) slurry from the Ziegler alcohol process of Example 1 in a vessel operating at a suitable revolution rate of low RPM at 105° C. for 2 hours. The pH was in the range of 5.5-6.0. The slurry was dried using a spray atomizer to obtain a final powder with an amount of organic composition of 8.9 parts in 100 parts of powder (0.68 mmol/g).

The powders had a BET surface area of 37 $m^2/g$ and pore volume of 0.73 Cc/g.

Figure 10:
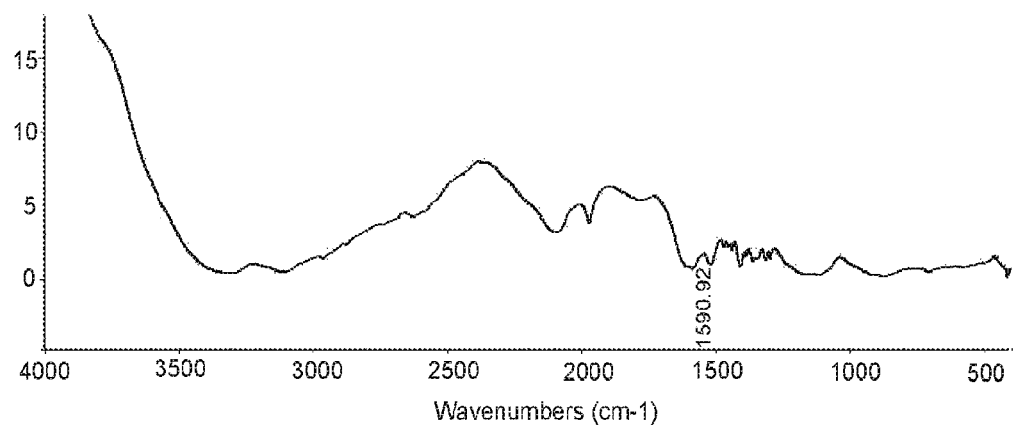
FIG. 10 is an FTIR spectra of the Alumina formed as per Example 3.

The FTIR spectra, FIG. 10, had similar features of Example 1 in the region of about 1580 cm-1.

3 g of powder with 100 g of PEG were agitated for 10 minutes. After 30 minutes no sedimentation occurred.

The mixture was centrifuged and the solid residue was evaluated after drying at 120° C. The % wt. of particles that remained in the supernatant after centrifugation with respect to the total amount initially added was 99% wt, which showed that particles were highly dispersible.

Figure 11:
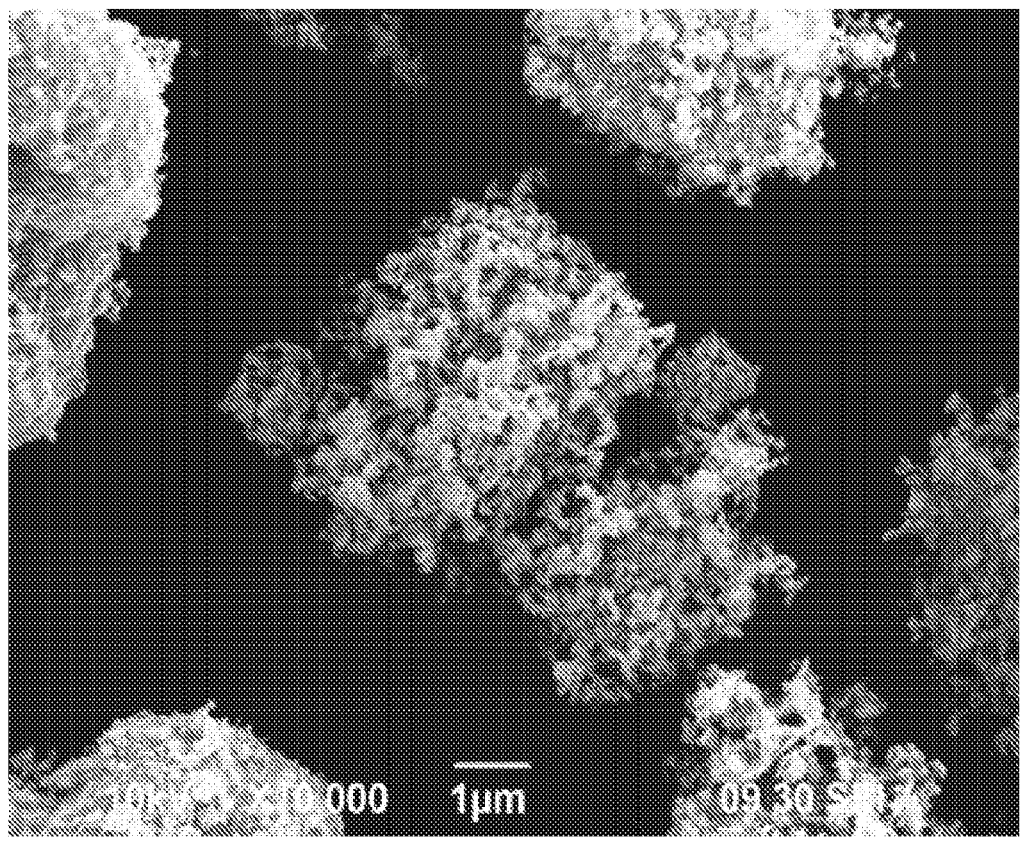
FIG. 11 is an SEM photo that shows the particle morphology of the product of Example 3.
Figure 12:
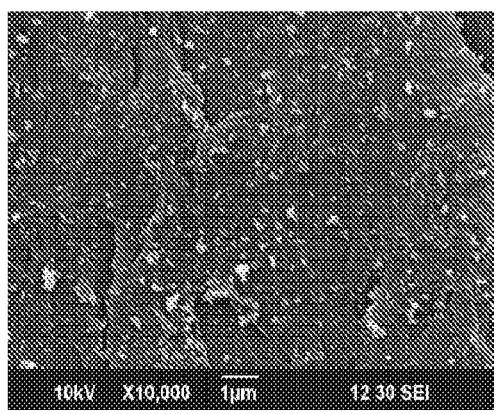
FIG. 12 shows the product of Example 3 onto polystyrene substrate.
Figure 12:
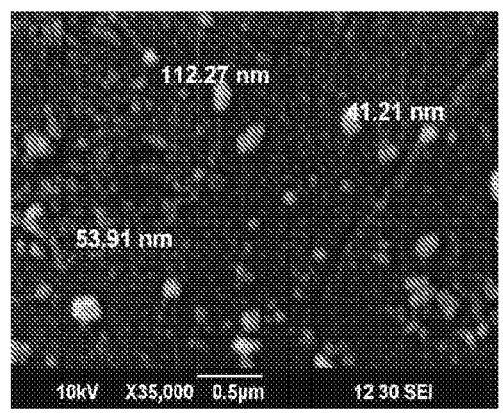

FIG. 11 shows the alumina particle morphologies and FIG. 12 shows the deagglomerated alumina particles on polystryrene.

In another procedure the preparation with Leucine was carried out with the same starting reagent solution and in the same mixing vessel under a revolution rate of higher RPM. After reaction the powder, which had essentially the same surface area as above, 37.3 $m^2/g$, had a pore volume of 0.53 cc/g. Thus if an appropriate mixing rate is applied in the vessel, the pore volume may be adjusted being as much higher as the mixing rate is lowered.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

The invention claimed is:

1. A method of producing a hydrophobic porous alumina comprising the steps of:
   i) providing a slurry comprising an alumina compound, the slurry having a pH equal to or greater than 7;
   ii) adding an organic composition comprising carboxylic acids with alkyl hydrocarbon chains having a carbon length less than 10, to the slurry to form an acidic modified slurry; the acidic modified slurry having a pH of between 3 and less than 7;
   iii) hydrothermally aging the acidic modified slurry to form a hydrothermally aged slurry; and
   iv) drying the hydrothermally aged slurry.

2. The method of claim 1 wherein the alumina compound includes aluminum oxide hydroxide (AlOOH), boehmite or pseudoboehmite.

3. The method of claim 1 wherein the organic composition comprises carboxylic acids with alkyl hydrocarbon chains having a carbon length of 9.

4. The method of claim 1 wherein the organic composition comprises carboxylic acids with alkyl hydrocarbon chains having a carbon length of 8 or less than 8.

5. The method of claim 1 in which the acid modified slurry has a pH of between 3.5 and 5.5.

6. The method of claim 1 wherein, the organic composition content relative to the content of alumina compound in the acidic modified slurry is between 0.5 and 10% wt.

7. A porous hydrophobic alumina prepared according to the method of claim 1.

8. A composition including a porous hydrophobic alumina prepared according to the method of claim 1 and a substrate.

9. The composition of claim 8 wherein the substrate includes polymers, crosslinked polymers, nylon resins, and acrylic resins e.g. polymethylmethlacrylate (PMMA), polystyrenes, styrene acrylate resins, polyester resins, waxes, polyethylene, polypropylene, polycarbonate, polyurethane, polyethylene terephthalate, rubber, epoxy resins, silicone, cellulose, fabric, polytetrafluoroethylene, silica glass particles, metal oxides, ceramics and carbon substrates.

10. A porous hydrophobic alumina including the following characteristics:
   i) an aspect ratio of between 1.80 and 5.0;
   ii) an average pore value between 0.55 cc/g and 2.0 cc/g;
   iii) a specific surface area of between 30_$m^2/g$ and 300 $m^2/g$; and
   iv) an organic composition content between 0.5 and 10 wt. % relative to the content of alumina.

* * * * *